(12) United States Patent
Tippett

(10) Patent No.: US 7,087,136 B2
(45) Date of Patent: Aug. 8, 2006

(54) BONDING UNSINTERED NON-EXPANDED PTFE FILM TO PTFE COATED SUBSTRATE

(75) Inventor: Stephen W. Tippett, New Boston, NH (US)

(73) Assignee: Textiles Coated International, Amherst, NH (US)

( * ) Notice: Subject to any disclaimer, the term of this patent is extended or adjusted under 35 U.S.C. 154(b) by 56 days.

(21) Appl. No.: 10/840,572

(22) Filed: May 6, 2004

(65) Prior Publication Data

US 2004/0261929 A1    Dec. 30, 2004

Related U.S. Application Data

(60) Provisional application No. 60/475,525, filed on Jun. 3, 2003.

(51) Int. Cl.
*B29C 65/00* (2006.01)
(52) U.S. Cl. .................. 156/309.6; 156/309.9
(58) Field of Classification Search ............. 156/555; 118/224, 114, 116, 117; 427/407.1, 412, 427/407.3
See application file for complete search history.

(56) References Cited

U.S. PATENT DOCUMENTS

| | | | | |
|---|---|---|---|---|
| 2,258,659 A | * | 10/1941 | Mosler, Jr. ................ | 156/231 |
| 4,610,918 A | * | 9/1986 | Effenberger et al. ......... | 442/68 |
| 4,702,956 A | | 10/1987 | Wilson et al. | |
| 2003/0062644 A1 | * | 4/2003 | Oyama et al. ............... | 264/41 |

FOREIGN PATENT DOCUMENTS

| | | |
|---|---|---|
| EP | 0 288 214 | 4/1988 |
| EP | 0 320 258 | 12/1988 |
| EP | 1 090 676 | 8/2000 |
| GB | 2 155 853 A | 10/1985 |
| WO | WO 92/09429 | 6/1992 |
| WO | WO 99/07551 | 2/1999 |

* cited by examiner

Primary Examiner—Sam Chuan Yao
Assistant Examiner—Barbara J. Musser
(74) Attorney, Agent, or Firm—Gauthier & Connors, LLP

(57) ABSTRACT

A method of bonding an unsintered unexpanded PTFE feed film to a flexible PTFE coated substrate comprises providing a three roll calender comprising a metal surfaced roll coacting with two filled rolls to define first and second nips. The PTFE feed film is calendered in the first nip, with the thus calendered PTFE film remaining supported on the metal surfaced roll for transport to and through the second nip. The PTFE coated substrate is directed through the second nip for calendering with and bonding to the calendered PTFE film to thereby produce a laminated composite.

7 Claims, 1 Drawing Sheet

BONDING UNSINTERED NON-EXPANDED PTFE FILM TO PTFE COATED SUBSTRATE

CROSS REFERENCED TO RELATED APPLICATION

This application claims priority from provisional patent application Ser. No. 60/475,525 filed Jun. 3, 2003.

BACKGROUND OF THE INVENTION

1. Field of the Invention

This invention relates generally to textile composites coated with polytetrafluoroethylene ("PTFE"), and is concerned in particular with a unique method of bonding unsintered and unexpanded PTFE films to flexible PTFE substrates.

2. Description of the Prior Art

For many decades, the industrial fabric marketplace has been using PTFE coated textile composites in a large number of applications. The very large majority of the composites have contained woven fiberglass fabric substrates. Over the years, the coated products have had an acceptable performance in most of the applications, offering thermal, chemical, and mechanical benefits to their users.

The PTFE coated fabrics are used as release sheets in the production of sticky materials and various food products. They can serve as conveyor belts in the same sticky material and food applications. Plastic films are heat sealed into packages using PTFE coated fabrics. Flue gas in power plants is confined to ducts by expansion joints containing PTFE coated fiberglass gas seals. Removable insulation systems contain PTFE coated fabrics to resist the many chemicals that come in contact with the insulation systems in chemical plants.

As with any material, there are limitations to the performance of PTFE coated textiles in industrial service. If the textile reinforcement is fiberglass, the fiberglass can fatigue rather quickly in severe mechanical flexing conditions. High temperatures can thermally degrade the PTFE polymer. Sharp objects can cut the coated composite. A major mechanism of failure that certainly occurs in many applications is the stress cracking of the PTFE coating on the coated product.

As the PTFE coated textile performs in industrial service, it is typically stressed mechanically and thermally. If chemicals are involved, it is stressed chemically as well. The stresses will inevitably take their toll in the form of fissures or cracks in the surface of the coated product. Over time in service, the cracks will broaden, eventually permitting materials to flow through them. The materials eventually come in contact with the product's textile reinforcement. Failure occurs a short time after due to, generally, release problems or reinforcement deterioration.

Because stress cracks in PTFE coated composites often create serious problems in performance, attempts have been made over the years to produce coated products with a more stress crack resistant surface. The best results have been provided by composites containing laminated PTFE films. Because the PTFE films possess mechanical properties that are greater than those found in the coated polymers, the laminated products resist stress cracks, often providing the composite with a longer life in industrial service.

PTFE composites containing laminated PTFE films have been in the marketplace for decades. PTFE films come in three main forms: 1) skived PTFE films; 2) cast PTFE films; and 3) paste extruded PTFE films. All three types are used to produce the laminated products.

Regardless of the type of film being laminated, the process is generally considered to be difficult. To varying degrees, the films are fragile and can be very difficult to handle. The lamination process involves high temperatures that can reach up to 725 F. Finally, pressure or stress must be placed on the films in order to initiate the lamination bond.

Skived PTFE films are produced in a sintered form only. In order to laminate the film, the film must be heated to the melt point of PTFE, which is around 650 F. During the heating process, the skived film will undergo thermal expansion. Wrinkles in the product will develop during the expansion, so the lamination process must be able to minimize the wrinkle formation during lamination. Additionally, the skived product can be difficult to bond using fluoropolymer adhesives. Due to these problems, only limited amounts of PTFE/fiberglass laminated composites incorporating skived PTFE films are found today in the marketplace.

Cast PTFE films are also produced in a sintered form only. While they are easier to seal using fluoropolymer adhesives, they still offer the same challenging thermal expansion problems associated with laminating skived PTFE films. Also, the cast films can only be produced to a thickness in the range of 0.004" to 0.005". Fiberglass laminates containing cast PTFE films are readily available in the marketplace and are being used for numerous industrial applications.

Paste extruded PTFE films are extruded in an unsintered unexpanded form at a specific gravity that typically ranges from 1.5 to 1.6. The unsintered and unexpanded PTFE films are easier to laminate for a number of reasons. First of all, because the film is at a specific gravity that is much lower than sintered PTFE, which has a specific gravity ranging from 2.1 to 2.3, the film does not experience the thermal expansion problems seen in cast and skived films as it is being heated to sintering temperatures—around 650 F. As a result, the unsintered film is easier to control during lamination and the finished composite can be more readily produced with fewer wrinkles and defects. Also, the unsintered film, as it is being heated to sintering temperatures, is more inclined than other PTFE films to adhere to sintered PTFE surfaces during lamination. Fluoropolyer adhesives are generally not needed to effect a bond between the unsintered film and the adjacent PTFE surface. Applying elevated temperature and pressure conditions with a reasonable residence time are usually sufficient conditions for creating a laminate. For these reasons, PTFE fiberglass laminated composites containing extruded PTFE films can be found in many industrial applications today around the world.

However, the unsintered PTFE films, by their nature, are very fragile. They can be easily damaged from only the slightest stress. Thus, they must be handled with great care prior to the bonding of the unsintered film to the substrate. The widths of the unsintered films, which were first manufactured decades ago, have remained very narrow until recent time. Extruded unsintered film widths were typically 6" or 8" wide. The unsintered films have been traditionally slit into narrows widths, such as ¼" or ½", for service in a number of industries including the wire/cable industry.

Over the last decade, a demand has emerged for wider unsintered film widths. As a result, the films can now be readily found in widths of 12" or even 14". The wider widths are required because the unsintered films are being laminated onto PTFE coated fiberglass composites for the purpose of creating laminated barrier materials for severe chemical service and other challenging industrial conditions. As the unsintered film width increases, the difficulties associated with handling and laminating the unsintered film also increase. If not accomplished properly, the resultant laminate will contain wrinkles and, in general, a non-uniform surface. The laminate will possess an aesthetically displeasing, defective, appearance that could very likely be porous and, as a result, be ineffective as a barrier to fluids.

SUMMARY OF THE INVENTION

The objective of the present invention is to provide a unique method for bonding an extruded unsintered and unexpanded film to a PTFE coated substrate. The invention provides for excellent control of the unsintered film during the lamination process, enabling production of laminated composites with a very uniform surface containing a greatly reduced number of film defects.

In accordance with the present invention, a three roll calender is provided having a metal surfaced heated roll coacting with two filled rolls to provide first and second nips. An unsintered unexpanded PTFE film is preliminarily calendered in the first nip after which it remains temporarily adhered to the metal surfaced roll for transport to and through the second nip. A PTFE coated substrate is directed through the second nip for calendering with and bonding to the preliminarily calendered film to thereby produce a laminated composite.

These and other features and advantages will now be described in greater detail with reference to the accompanying drawings, wherein:

DETAILED DESCRIPTION OF THE INVENTION

Figure 1:
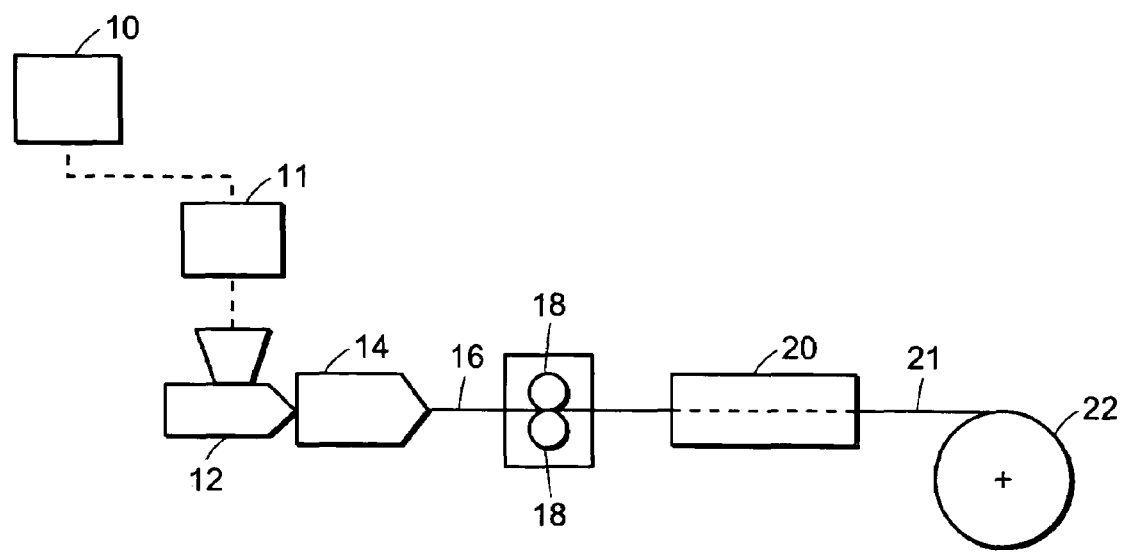
FIG. 1 diagrammatically depicts the preparation of unsintered unexpanded PTFE film.

In accordance with the present invention, and as depicted diagrammatically in FIG. 1, a PTFE resin is combined with an extrusion aid, which is typically a solvent, in a mixer 10 to produce a paste. The resin may comprise DF-230 supplied by Solvay Solexis, Thorofare, N.J., and the solvent may comprise Mineral Spirits Odorless supplied by Ashland Specialty Chemical Co., Columbus, Ohio.

The next step after blending the PTFE resin and the solvent is preforming, which removes the air from the paste. After the paste has been pressed in the preform mold 11, it is delivered to an extruder 12 which extrudes the paste through a film die 14 to produce a solvent laden film 16. The film 16 is calendered to a desired thickness between two metal rolls 18, and then is directed through an oven 20 where the solvent is evaporated, with the thus dried unexpanded unsintered film 21 being then wound onto a storage reel 22.

Films produced in this manner are somewhat typical of those produced by conventional processes, with thicknesses ranging from about 0.002" to 0.010", microstructures characterized by voids resulting from solvent evaporation, specific gravities of about 1.6, and tensile strengths in the machine direction of 700 to 1800 psi.

Figure 2:
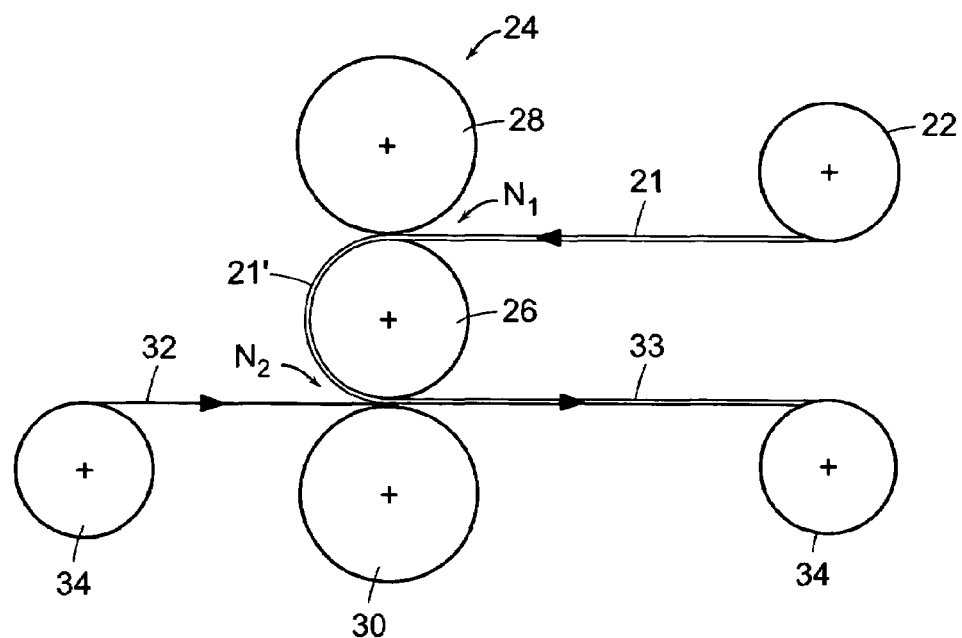
FIG. 2 illustrates the apparatus for bonding the thus prepared PTFE film to a PTFE coated substrate.

With reference to FIG. 2, the present invention employs a three roll calender generally depicted at 24. The calender comprises a metal surfaced roll 26 coacting with filled rolls 28, 30 to define first and second nips $N_1$, $N_2$. Roll 26 is heated to an elevated temperature ranging between about 100° to 170° F.

The unsintered film 21 is unwound from reel 22 and fed through the nip $N_1$ where a threshold reduction in thickness of approximately 20% collapses the voids produced by the previous solvent evaporation and increases the film's specific gravity to about 2.0. Further reductions in thickness in excess of 20% result in reductions of the film's weight per unit area. By maintaining uniform back tension in the film 21 between the reel 22 and the first nip $N_1$ the preliminarily calendared film 21' exiting from nip $N_1$ will be uniform and free of defects.

As the preliminarily calendered film 21' exits from nip $N_1$, it selectively adheres to the metal roll 26 due to its higher temperature. The adherence to the metal roll of the unsintered film is a critical aspect of the invention. By adhering to the metal roll, the unsintered film acquires a very stable, reinforcing carrier surface that is most capable of delivering the unsintered film in an undisturbed, excellent, condition to the second nip $N_2$. The adherence of the unsintered film to the metal roll enables the lamination process to automatically avoid the serious wrinkling and distortion problems conventionally encountered when working with unsintered PTFE films.

As the unsintered film travels around on the metal surfaced roll 26, it ultimately arrives at the second nip $N_2$, where the film encounters a feed substrate 32 being directed into nip $N_2$ from an adjacent storage reel 34.

The feed substrate 32 is a PTFE coated textile. For one example, style 7628 woven fiberglass fabric, as manufactured by JPS Industrial Fabrics, Slater, S.C., is coated in a vertical tower using an aqueous PTFE dispersion, such as D60G, which is produced by Solvay Solexis, Thorofare, N.J. PTFE resin contents will often range from 25% to 50%. The invention may employ fabric substrates with either sintered or unsintered PTFE coatings.

The unsintered film, temporarily anchored to the metal roll, transfers directly to one side of the PTFE coated substrate 32 as it travels through the second nip. The resulting laminated composite 33 is then wound onto storage reel 34. During the transfer, at no point is the unsintered film unsupported or allowed to distort or fold in a manner that would produce a wrinkled, non-uniform surface on the PTFE coated substrate. The application of very thin films, often considered impractical for a lamination process, is now very plausible since the unsintered film is never unsupported throughout its existence. To apply a film to the other side of the PTFE coated substrate, the process is repeated with an unsintered film applied to the remaining coated side of the PTFE substrate.

When the PTFE substrate has received the specified number of laminated films, the temperature of the laminated composite is raised to a minimum of about 650 F in order to sinter the unsintered components in the composite and complete the product. This can take place in a separate coating tower or a heated press (not shown), to name two types of sintering equipment.

COMPARATIVE EXAMPLE 1

Laminated composites of an unsintered non-expanded PTFE film and a PTFE coated fiberglass fabric were produced. The film was a 3.64 oz/sq yd (0.003" nominal thickness) unsintered and unexpanded extruded PTFE film with a 14" width and with a specific gravity ranging between 1.5 and 1.6. The film was manufactured by Textiles Coated International, Amherst, N.H. The sintered PTFE coated fiberglass fabric consisted of style 7628 fiberglass fabric coated to a weight of 8 oz/sq yd. The style 7628 fabric was produced by Bedford Mills, Bedford, Va. The PTFE dispersion used for the coating was D60G, as manufactured by Solvay Solexis, Thorofare, N.J. The coated product was produced by Textiles Coated International, Amherst, N.H.

The composites were produced on a 3 roll calender. However, both the film and the coated substrate were sent through the same calender nip simultaneously so as to bond the unsintered film to the substrate. The two rolls making up the nip were a heated metal roll and a wool/cotton filled roll. The wool/cotton roll was 17½" in diameter and 41¾" wide. The metal roll was 10" in diameter and 45½" wide. The metal roll was heated to 170 F. The calender rolls operated at a speed of 2 ft/min and a pressure of 1218 lbs/lineal inch ("PLI"). The unsintered film was laminated to only one side of the PTFE coated substrate. After calendaring, the laminated composites were sintered in a press consisting of flat metal plates operating at a temperature of 725 F and a pressure of 40 psi.

The equipment was set up so that the film could be back tensioned during the lamination process. Previous tests had shown that film back tensioning is required to minimize distortion and folding of the film as it enters the nip. Using the unsintered PTFE film and the coated style 7628 substrate, 6 laminated composites were produced at different back tension loads. Results are summarized in Table 1.

TABLE 1

| Backtension (lbs/in) | Total Product Weight (oz/sq yd) | PTFE Film Weight (oz/sq yd) | Porosity |
|---|---|---|---|
| 0.8 | 11.36 | 3.36 | nonporous |
| 1.59 | 11.27 | 3.27 | nonporous |
| 2.38 | 11 | 3 | nonporous |
| 3.03 | 10.59 | 2.59 | porous |
| 3.59 | 10.35 | 2.35 | porous |
| 3.76 | 10.28 | 2.28 | porous |

The results indicate that the laminated film's weight dropped as the back tension was increased. For example, the process was begun with a back tension of 0.8 lbs/in, which resulted in a film weight of 3.36 oz/sq yd—a reduction in film weight of 7.7%. At a back tension of 3.76 lbs/in, the film weight lowered to 2.28 oz/sq yd.

Porosity was measured by exposing the specimens to an air pressure differential that ranged from 1 psig to 6 psig. As can be observed in the results, when the film weight dropped below 3.00 oz/sq yd, the laminated test specimens became porous.

In general, the six specimens had a uniform, smooth, film surface. However, it is important to note that extreme care had to be given to minimize wrinkles as the back tensioned film came in contact with the coated substrate at the calender nip during lamination.

EXAMPLE 2

The same unsintered film and PTFE coated fiberglass components used in Example 1 were used to produce five laminated products in accordance with the double nip calender process of the present invention. The unsintered film was sent through the first nip of a calender similar to that used in Example 1. The top nip was formed by a urethane roll and a heated metal roll, which operated at 170 F. The urethane roll was 18½" in diameter and 42⅞" wide. The calender pressure was 1218 PLI and the roll speed was 2 fpm.

As the unsintered film traveled through the first calender nip, the film adhered to the heated metal roll. The adhered film traveled on the metal roll to the second calender nip. The second calender nip was made up of the metal roll and the wool/cotton filled roll, as described in Example 1. As the film entered the second nip, it came in contact with the PTFE coated substrate, which was also being fed into the second calender nip. The unsintered film was laminated to only one side of the PTFE coated substrate. After calendering, the laminated composite was sintered in a press consisting of flat metal plates operating at a temperature of 725 F and a pressure of 40 psi. The results are summarized in Table 2.

TABLE 2

| Backtension (lbs/in) | Total Product Weight (oz/sq yd) | PTFE Film Weight (oz/sq yd) | Porosity |
|---|---|---|---|
| 0.8 | 11.19 | 3.19 | nonporous |
| 1.59 | 11.25 | 3.25 | nonporous |
| 2.38 | 10.9 | 2.9 | nonporous |
| 3.03 | 10.87 | 2.87 | nonporous |
| 3.76 | 10.43 | 2.43 | nonporous |

As can be seen from the results in Table 2, the unsintered film was back tensioned at different loads during the experiment. As with the results in Example 1, a progressively increased back tension load resulted in progressively thinner film weights, with the exception of the specimen produced with a 1.59 lbs/in back tension load. It is believed that the weight of 3.25 oz/sq yd for that specimen is an exception due to what was an abnormally high weight for that portion of the feed film used to produce the specimen.

Because the unsintered PTFE film was the sole component traveling through the first nip of the calender, it was very easy to minimize any wrinkles that tended to develop during the back tensioning of the film in the calendering step. The few wrinkles that did manage to enter the first nip were "calendered away" as the unsintered film was compressed and remade on the metal roll. Accordingly, the remade unsintered film was fully supported by the metal roll as it was being conveyed to the second nip, where the film became laminated to the PTFE coated fiberglass substrate. All specimens produced in the double nip process contained blemish-free film surfaces.

All specimens produced nonporous results when tested to a 6 psig differential air pressure. This is a critical detail because it indicates that products produced via the invention have the capability of serving as barriers at very low film weights.

It is believed that the improved nonporosity results are due to the unsintered PTFE film being laminated to the PTFE coated substrate at a higher specific gravity, which is estimated to be in the vicinity of 2.0. The unsintered PTFE film is sent to the first nip with a specific gravity ranging between 1.5 and 1.6. Depending upon the back tension load being applied, the unsintered film arrives at the first nip with a reduced film weight, due to film stretching or elongation. The specific gravity may also be slightly changed with the film stretching. After it travels through the nip, the film becomes compressed, resulting in an unsintered PTFE film with a specific gravity around 1.9 to 2.0.

In the single nip process, the unsintered PTFE film is also paid off with a specific gravity of 1.5 to 1.6. Depending upon the back tension applied, the film will stretch on its way to the nip. The stretching process may slightly alter the film's specific gravity. In this process, the unsintered arrives at the nip where it comes in contact with the PTFE coated fiberglass fabric. An unsintered PTFE film with a specific gravity in the vicinity of 1.5 to 1.6 can be described as having soft, moldable, clay-like, properties. When a film with these properties is pressed onto a PTFE coated fiberglass fabric in the calender nip, the unsintered film is inclined to move or flow into the larger openings or interstices in the coated fabric. In doing so, the unsintered film increases its surface area and, accordingly, reduces its thickness and film-like characteristics.

On the other hand, the unsintered PTFE film from the double nip process of the present invention, with its much higher specific gravity of 1.9 to 2.0. is substantially more mechanically stable than the film produced in the single nip process. The denser film is far less inclined to distort or move under the pressure of the calender nip as it comes in contact with the PTFE coated substrate. Consequently, the higher specific gravity film has a much better probability of retaining film-like properties in the production of laminated composites.

In a variation of the procedure described in Example 2, the upper nip $N_1$ of the three roll calender 24 can be fed with an unsintered PTFE film that has been pre-calendered with back tension in a separate operation to reduce its thickness by more than 20% and to increase its specific gravity to about 2.0. The condition of the thus pre-calendered film will remain essentially unchanged as it passes through nip $N_1$ and is carried on the surface of roll 26 into the second nip N2. The main advantage to this altered procedure is that any film marred by stress-related defects occurring during initial calendering can be culled before being combined with the PTFE coated textile. The culled film can usually be recycled for other uses, typically as an inner film component of other multilayer laminates.

I claim:

1. A method of bonding an unsintered unexpanded PTFE feed film to a flexible PTFE coated substrate, comprising:
   providing a three roll calender comprising a metal surfaced roll coacting with two filled rolls to define first and second nips;
   calendering said PTFE feed film in said first nip with back tension;
   transporting the thus calendered film on the surface of said metal surfaced roll into said second nip; and
   directing the PTFE coated substrate through said second nip for calendering with and bonding to said calendered PTFE film to thereby produce a laminated composite.

2. The method of claim 1 wherein said feed film has a specific gravity ranging from about 1.5 to 1.6, with the calendering in said first nip reducing the thickness of said feed film by more than 20% with an accompanying increase in its specific gravity to about 2.0.

3. The method of claims 1 or 2 wherein said metal surfaced roll is heated to a temperature ranging from about 100° to 170° F.

4. A method of producing a laminated composite comprising a PTFE coated fabric substrate and at least one PTFE film, said method comprising:
   providing a three roll calender comprised of a metal surfaced roll coacting with two filled rolls to define first and second nips;
   heating said metal surfaced roll to a temperature ranging from about 100° to 170° F.;
   preparing an extruded, unsintered and unexpanded PTFE feed film having a specific gravity of about 1.6;
   preparing a textile substrate coated with an aqueous PTFE dispersion;
   calendering said PTFE feed film with back tension in said first nip with the calendered film emerging from said first nip being transported on said metal surfaced roll into said second nip;
   and;
   directing said coated textile substrate into said second nip for calendering with and bonding to the calendered film received from said first nip to produce said laminated composite.

5. The method as claimed in claim 4 wherein the calendering in said first nip reduces the thickness of said feed film by more than 20% with an accompanying increase in its specific gravity to about 2.0.

6. The method of claim 4 wherein said feed film is pre-calendered with back tension in advance of said first nip to thereby increase the specific gravity of said feed film to about 2.0 while decreasing its thickness by more than 20%.

7. The method of claim 1 wherein said feed film is pre-calendered under tension prior to its entry into said first nip to reduce its thickness by more than 20%, with an attendant increase in its specific gravity from about 1.5 to 1.6 to about 2.0.

* * * * *